US009689181B2

(12) United States Patent
Lindmark et al.

(10) Patent No.: US 9,689,181 B2
(45) Date of Patent: Jun. 27, 2017

(54) BONNET LATCH BRACKET ARRANGEMENT

(71) Applicant: VOLVO CAR CORPORATION, Gothenburg (SE)

(72) Inventors: Peter Lindmark, Hisings Backa (SE); Jan Palovaara, Gothenburg (SE)

(73) Assignee: VOLVO CAR CORPORATION (SE)

( * ) Notice: Subject to any disclaimer, the term of this patent is extended or adjusted under 35 U.S.C. 154(b) by 517 days.

(21) Appl. No.: 13/934,077

(22) Filed: Jul. 2, 2013

(65) Prior Publication Data

US 2014/0008502 A1    Jan. 9, 2014

(30) Foreign Application Priority Data

Jul. 3, 2012    (EP) .................................... 12174691

(51) Int. Cl.
*E05B 83/24*    (2014.01)
*E05B 79/04*    (2014.01)
(Continued)

(52) U.S. Cl.
CPC .............. *E05B 79/04* (2013.01); *B60R 21/34* (2013.01); *E05B 63/0056* (2013.01);
(Continued)

(58) Field of Classification Search
USPC ............ 248/220.21, 220.22, 221.11, 222.11, 248/222.51, 222.52; 292/DIG. 14, 229;
(Continued)

(56) References Cited

U.S. PATENT DOCUMENTS

| | | | | |
|---|---|---|---|---|
| 2,793,061 A | * | 5/1957 | Dall | .................................. 292/6 |
| 3,397,906 A | * | 8/1968 | Beckman | ................ E05B 83/16 |
| | | | | 292/108 |

(Continued)

FOREIGN PATENT DOCUMENTS

| | | |
|---|---|---|
| DE | 10308371 A1 | 9/2004 |
| DE | 102007034556 A1 | 1/2009 |

(Continued)

OTHER PUBLICATIONS

European Search Report Dated Feb. 28, 2013, Application No. 12174691.1-1503—Applicant Volvo Car Corporation, 6 Pages.

*Primary Examiner* — Alfred Wujciak
(74) *Attorney, Agent, or Firm* — Brooks Kushman P.C.

(57) ABSTRACT

A bonnet latch bracket arrangement that is adaptable to different vehicle models comprises a bonnet latch, a bracket member and a vehicle body member. The bonnet latch is attachable to the vehicle body member by means of the bracket member, and the bracket member is adapted to take up dimensional differences between the bonnet latch and the vehicle body member in a longitudinal direction, lateral direction and/or height direction of a vehicle. Furthermore, the adaptability to different vehicle models is achievable by varying the geometry of the bracket member according to the dimensions of the vehicle model. A modular system for configuration of a bonnet latch bracket arrangement to different vehicle models and a method for adapting a bonnet latch bracket arrangement to fit in different vehicle models are also provided.

18 Claims, 4 Drawing Sheets

(51) Int. Cl.
*B60R 21/34* (2011.01)
*E05B 63/00* (2006.01)
*E05B 77/02* (2014.01)

(52) U.S. Cl.
CPC ............. *E05B 77/02* (2013.01); *E05B 83/24* (2013.01); *B60R 2021/343* (2013.01); *Y10T 29/49* (2015.01)

(58) Field of Classification Search
USPC ............................................ 180/69.21, 69.2
See application file for complete search history.

(56) References Cited

U.S. PATENT DOCUMENTS

| | | | | |
|---|---|---|---|---|
| 3,974,753 | A * | 8/1976 | Blomgren et al. | 296/218 |
| 6,014,876 | A * | 1/2000 | Taylor | 70/240 |
| 6,280,592 | B1 * | 8/2001 | Mastrofrancesco et al. | 204/485 |
| 7,597,384 | B2 * | 10/2009 | Wallman et al. | 296/187.04 |
| 2006/0170224 | A1 * | 8/2006 | Mitchell et al. | 292/216 |
| 2010/0270813 | A1 | 10/2010 | Roth et al. | |
| 2014/0061407 | A1 * | 3/2014 | Townson et al. | 248/205.1 |
| 2014/0084632 | A1 * | 3/2014 | Kageyama et al. | 296/193.09 |

FOREIGN PATENT DOCUMENTS

| | | | |
|---|---|---|---|
| DE | 102008039731 A1 | 3/2010 | |
| EP | 2045146 A1 | 4/2009 | |
| EP | 2374665 A1 | 10/2011 | |
| GB | 741888 A * | 12/1955 | ............. E05B 83/24 |

\* cited by examiner

BONNET LATCH BRACKET ARRANGEMENT

CROSS-REFERENCE TO RELATED APPLICATIONS

This application claims foreign priority benefits under 35 U.S.C. §119(a)-(d) to European patent application number EP 12174691.1, filed Jul. 3, 2012, which is incorporated by reference in its entirety.

TECHNICAL FIELD

The present disclosure relates to a bonnet latch bracket arrangement, as well as to a modular system for configuration of a bonnet latch bracket arrangement to different vehicle models and a method for adapting a bonnet latch bracket arrangement to fit in different vehicle models.

BACKGROUND

A vehicle, such as a car, normally comprises a bonnet which is openable in order to allow access to the engine compartment, e.g., for maintenance. At the front of the vehicle there are one or more bonnet latches for locking the openable bonnet in a closed state. The bonnet latch connects the bonnet to the vehicle body when in the closed state. The location of the bonnet latch/es is/are preferably adapted to the dimensions of the vehicle model. If using one bonnet latch, it is usually placed at a location corresponding to the centre of a front region of the bonnet. If two bonnet latches are used, they are normally located at locations corresponding to the front portion of the lateral edges of the bonnet. It is also possible to use a plurality of bonnet latches, which may be distributed over locations corresponding to the front region of the bonnet.

When the bonnet of the vehicle is closed, it should be securely latched in its closed state in order to prevent the bonnet being opened by relative wind and vibrations during operation of the vehicle. Furthermore, in the event of a collision, the bonnet should be deformed in a predeterminable manner. It is therefore important that the bonnet latch structure is capable of retaining the bonnet in the closed state during the collision.

The front part of a vehicle may be constructed in different ways. It is known to use a so-called soft-nose configuration. The soft nose is often constructed from a thermoplastic, which partially may serve to mitigate the consequences of a collision with a pedestrian. In a soft-nose vehicle a soft nose panel meets the bonnet of the vehicle at a more rearward position than for a standard-nose vehicle, wherein the bonnet meets the grille at the front of the vehicle.

Document EP 2 045 146 A1 discloses a bonnet latch structure for a soft-nose vehicle. The vehicle comprises a soft-nose outer skin panel and a bonnet providing an overlying structure for a grille opening reinforcing front cross member. The front cross member supports at least one bonnet latch carried by a member protruding towards the front of the vehicle. The member is designed to collapse downwards causing the bonnet latch to move downwards when subjected to longitudinal loads above 0.6 kN distributed thereupon by the overlying structure. As a consequence of the collapse, the bonnet latch may move away to provide a forgiving upper leg impact zone for the protection of a pedestrian in the event of a collision with the motor vehicle.

However, a bonnet latch structure according to EP 2 045 146 A1 has a geometrical shape which is adapted to be used in a certain soft-nose vehicle model. If used in another soft-nose vehicle model, having other geometrical dimensions, the configuration of the bonnet latch structure needs to be changed to fit to the dimensions of that other vehicle model. Furthermore, the configuration of the bonnet latch structure needs further changes in order to fit in a standard-nose vehicle model. Since the change of the configuration comprises changing the shape and the size of the front cross member, it will be quite costly since new tools are needed for manufacturing.

SUMMARY

An object of the present disclosure is to overcome or ameliorate at least one of the disadvantages of the prior art, or to provide a useful alternative.

It is desirable to provide a bonnet latch bracket arrangement, which is adaptable for different vehicle models.

Thus, in a first aspect of the present disclosure there is provided a bonnet latch bracket arrangement for a vehicle, which arrangement is adaptable to different vehicle models. The arrangement comprises:
 a bonnet latch,
 a bracket member, and
 a vehicle body member.

The bonnet latch is attachable to the vehicle body member by means of the bracket member. The bracket member is adapted to take up dimensional differences between the bonnet latch and the vehicle body member in a longitudinal, lateral and/or height direction of the vehicle. The adaptability to different vehicle models is achieved by varying the geometry of the bracket member according to the dimensions of the vehicle model.

If using a bonnet latch bracket arrangement according to the disclosure, it is possible to easily adapt the bonnet latch bracket arrangement to the actual vehicle model by adapting the geometry of the bracket member. The vehicle body member may be a cross member adapted to be located at the front of the vehicle. This means that the same kind of vehicle body member and bonnet latch may be used for different vehicle models. Thereby the manufacturing cost and/or storage cost for the vehicle body member and/or the bracket member will be reduced as compared to conventional technology using a vehicle body member and a bracket member adapted to the specific vehicle model. At a workshop, fewer spare parts are needed.

The bonnet latch bracket arrangement may further be adapted to different crash scenarios by adapting the bracket member. The same kind of vehicle body member and bonnet latch may then be used for different crash scenarios.

A first of the different vehicle models may be a soft-nose vehicle and a second of the different vehicle models may be a standard-nose vehicle. As is known by the skilled person, a soft nose panel meets the bonnet of the vehicle at a more rearward position than in a "standard-nose vehicle, wherein the bonnet meets the grille at the front of the vehicle. However, according to the disclosure, the bonnet latch and the vehicle body member can have the same geometry for the soft-nose and standard-nose vehicle models, since the adaptability to the first and the second vehicle models is achieved by varying the geometry of the bracket member.

One, two or more bonnet latches may be used. The may each have a corresponding bracket member. However, if two of the bonnet latches are located close to each other, they may share a bracket member. If two bonnet latches are used, they are normally located at locations corresponding to the front portion of the lateral edges of the bonnet. There is then suitably one bracket member at each side for each of the bonnet latches.

The bracket member may comprise a sleeve portion enclosing a portion of the vehicle body member. The sleeve portion is preferably adapted to be welded to or heat shrunk to the vehicle body member. Thereby the bracket member is securely attached to the vehicle body member.

The bracket member may in addition be adapted to be attached to a side beam of the vehicle.

The bracket member may be collapsible. It may be adapted to collapse when impacted by a force above a predefined level, the predefined level being lower than a level of a force needed to collapse the bonnet latch and/or the vehicle body member. Thereby the bracket member will collapse first, i.e, before the bonnet latch and/or the cross member in case of a frontal collision or a collision at least partly acting on the front of the vehicle. Therefore, if the collision is not too severe, it may be enough to only replace the bracket member, instead of having to replace the whole bonnet latch bracket arrangement, which is the case for known prior art solutions. This would reduce the cost of the repair. The predefined level may be selected by adapting the shape of the bracket member and/or the material of it.

In an embodiment, bracket member is configured to collapse in a preferred direction, when mounted in the vehicle, the preferred direction preferably being substantially in a longitudinal direction of the vehicle. The preferred direction thus corresponds to a collision case of a frontal collision or a collision at least partly acting on the front of the vehicle. The bracket member may thus be designed to withstand higher forces in the height direction of the vehicle than in the longitudinal direction of the vehicle.

The bracket member may comprise a framework structure. The framework structure provides a strong construction, which is not too heavy. By selecting the geometry of the framework, it is for example possible to achieve the above-described preferred direction of collapse.

The framework structure may comprise a collapse trigger point. The trigger point is for example a relatively weak point of the framework wherein the collapse of the bracket member will start. The location of the trigger point has been chosen to achieve a controlled collapse of the bracket member.

The bracket member may be made of an extruded material, preferably extruded aluminum. Extrusion is for example a suitable way of manufacturing the above-mentioned framework structure. Alternatively, it may be made of steel. The bonnet latch may be of steel. The vehicle body member may be of steel or aluminum.

In an embodiment, the bracket member comprises a first bracket member portion and at least one second bracket member portion. The first bracket member portion is adapted to fit in a first vehicle model. The second bracket member portion is adapted to be used in combination with the first bracket member portion in order to fit into a second vehicle model. In this embodiment, the adaptability to different vehicle models is achieved by changing the geometry of the second bracket member portion having the first bracket member portion as a lowest common denominator. Purely as an example, the first bracket member portion may be selected to fit in a soft-nose vehicle. The second bracket member portion is then chosen, such that it takes up the dimensional differences in the longitudinal, lateral and/or height direction between the soft-nose vehicle and a standard-nose vehicle. A third vehicle model may have a third bracket member portion, which may be used in combination with the first bracket member portion or, as an alternative, the first, second and third bracket members may be used in combination.

In a second aspect of the present disclosure there is provided a bracket member adapted for use in a bonnet latch bracket as described above.

In a third aspect of the present disclosure there is provided a second bracket member portion adapted for use in combination with a first bracket member portion in order to form a bracket member of a bonnet latch bracket arrangement according to above.

In a fourth aspect of the present disclosure there is provided a modular system for configuration of a bonnet latch bracket arrangement to different vehicle models, the system comprising:

a bonnet latch a vehicle body member, and i bracket member variants i being a positive integer.

The bonnet latch is attachable to the vehicle body member by means of one of the bracket member variants. The bracket member variant is adapted to take up dimensional differences between the bonnet latch and the vehicle body member in a longitudinal, lateral and/or height direction of the vehicle. Each of the bracket member variants has a geometry adapted to the dimensions of one of the different vehicle models.

As explained above the bracket member variant may be in one unit. The geometry will then be different between different vehicle models. Alternatively, the changed geometry may be achieved by using a first bracket member portion being common to many vehicle models and using at least one second bracket member portion to achieve the adaptation to the individual vehicle model.

In a fifth aspect of the present disclosure there is provided a method for adapting a bonnet latch bracket arrangement to fit in different vehicle models, such as a soft-nose vehicle and a standard-nose vehicle. The bonnet latch bracket arrangement comprises a bonnet latch a bracket member and a vehicle body member. The bonnet latch is attachable to the vehicle body member by means of the bracket member. The bracket member is adapted to take up dimensional differences between the bonnet latch and the vehicle body member in a longitudinal, lateral and/or height direction of the vehicle. The method comprises the step of:

selecting the geometry of the bracket member while keeping the geometry of the bonnet latch and the vehicle body member, such that the bracket member fits the geometry of the vehicle model.

In a sixth aspect of the present disclosure there is provided a vehicle comprising a bracket member, a second bracket member portion and/or a bonnet latch bracket arrangement according to above.

BRIEF DESCRIPTION OF THE DRAWINGS

Non-limiting examples according to the present disclosure will hereinafter be further explained with reference to the appended drawings wherein.

It should be noted that the appended drawings are not necessarily drawn to scale and that the dimensions of some features of the present disclosure may have been exaggerated for the sake of clarity.

DETAILED DESCRIPTION

The disclosure will, in the following, be exemplified by embodiments. It should however be realized that the embodiments are included in order to explain principles of the disclosure and not to limit the scope of the invention, defined by the appended claims. Details from two or more of the embodiments may be combined with each other.

Figure 1:
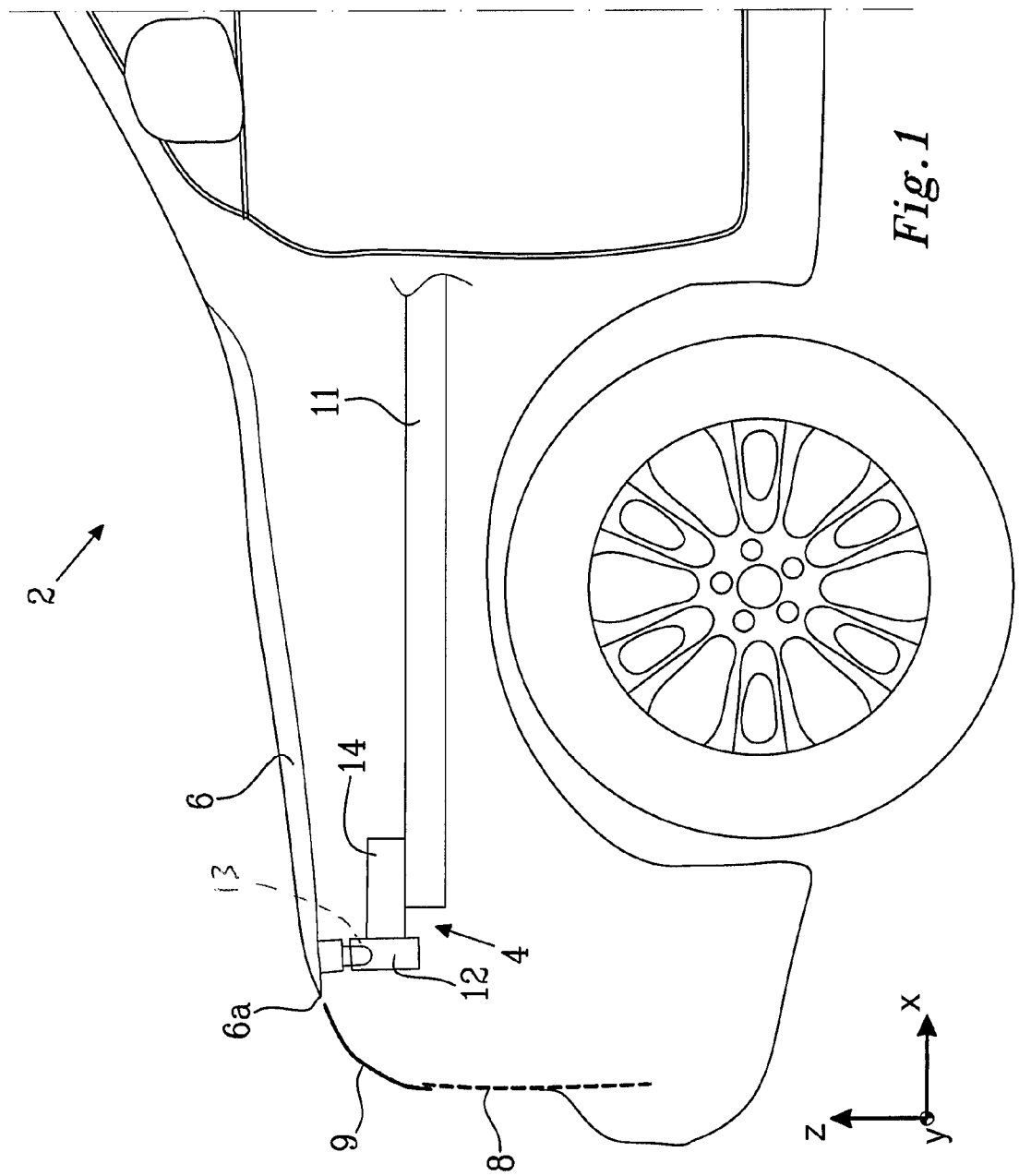
FIG. 1 illustrates a soft-nose vehicle comprising a bonnet latch bracket arrangement according to a first embodiment of the disclosure.

FIG. 1 schematically illustrates a soft-nose vehicle 2 comprising a bonnet latch bracket arrangement 4 according to a first embodiment of the disclosure. The vehicle 2 comprises an openable bonnet 6, a grille 8 and a soft nose panel 9, which meets the bonnet 6 at a front edge 6a of the bonnet 6. The bonnet latch bracket arrangement 4 comprises a cross member 10 (not visible in FIG. 1, but in FIG. 2), which forms part of the vehicle body, two bonnet latches 12, located adjacent to each lateral edge of the bonnet 6 and two bracket members 14, located at the ends of the cross member 10. Each bonnet latch 12 is attached to the cross member 10 by means of the bracket member 14. The bonnet latch 12 is adapted to receive a striker 13 comprised in the bonnet 6 to be able to hold the bonnet 6 in a closed state. The bracket member 14 is adapted to take up dimensional differences between the bonnet latch 12 and the cross member 10 in a longitudinal x, a lateral y and/or a height direction z of the vehicle 2. Further, each bracket member 14 is attached to a side beam 11, which also forms part of the vehicle body and which is located at a lateral side of the vehicle 2.

Figure 2:
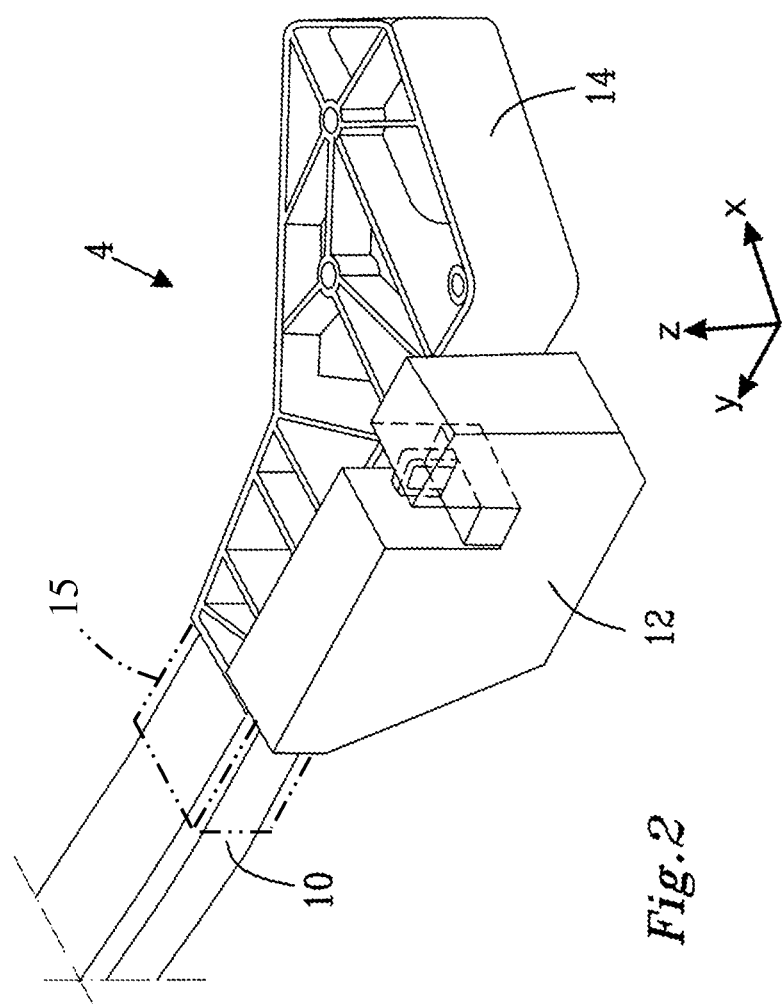
FIG. 2 illustrates a detail of the bonnet latch bracket arrangement of FIG. 1.

FIG. 2 illustrates the bonnet latch bracket arrangement 4 of FIG. 1 in greater detail in a perspective view. The bracket member 14 comprises a framework structure and is suitably made of extruded aluminum. The bracket member 14 may comprise a sleeve portion 15 (shown in phantom lines in FIG. 2) enclosing a portion of the cross member 10 (e.g., vehicle body member), and the sleeve portion 15 is adapted to be welded to or heat shrunk to the cross member 10 such that the bracket member 14 is securely attached to the cross member 10. The bracket member 14 is adapted to collapse when impacted by a force above a predefined level, which is lower than a level of a force needed to collapse the bonnet latch 12 and/or the cross member 10. Thereby the bracket member 14 will collapse before the bonnet latch 12 and/or the cross member 10 in case of a frontal collision or a collision at least partly acting on the front of the vehicle 2. Therefore, if the collision is not too severe, it may be enough to only replace the bracket member 14, instead of having to replace the whole bonnet latch bracket arrangement 2, which is the case for known prior art solutions.

The framework of the bracket member 14 is designed such that the bracket member 14 has a preferred collapse direction being substantially in the longitudinal direction x of the vehicle 2, while the bracket member 14 is able to withstand a higher force in the z-direction.

Figure 3:
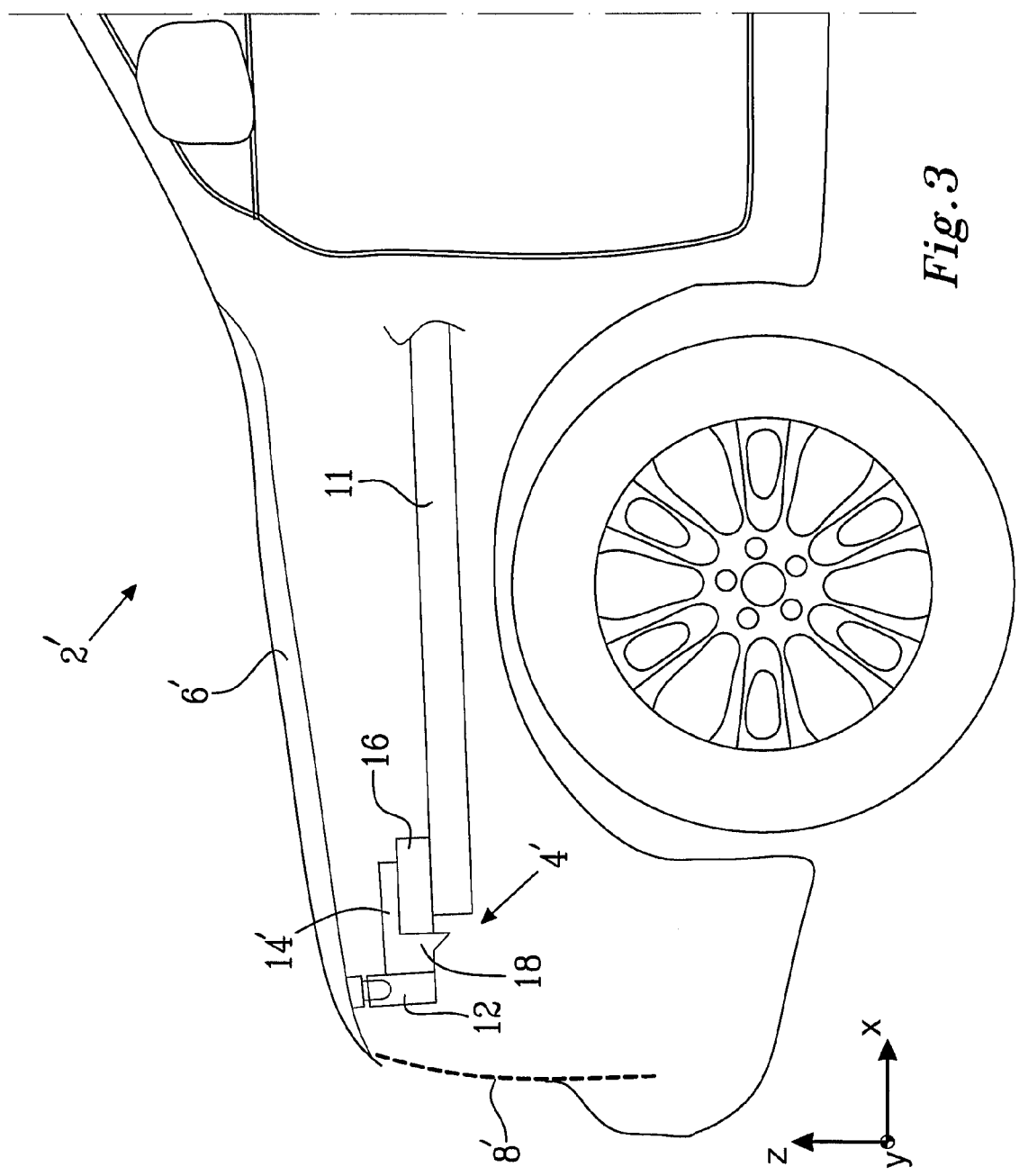
FIG. 3 illustrates a standard-nose vehicle comprising a bonnet latch bracket arrangement according to a second embodiment of the disclosure.
Figure 4:
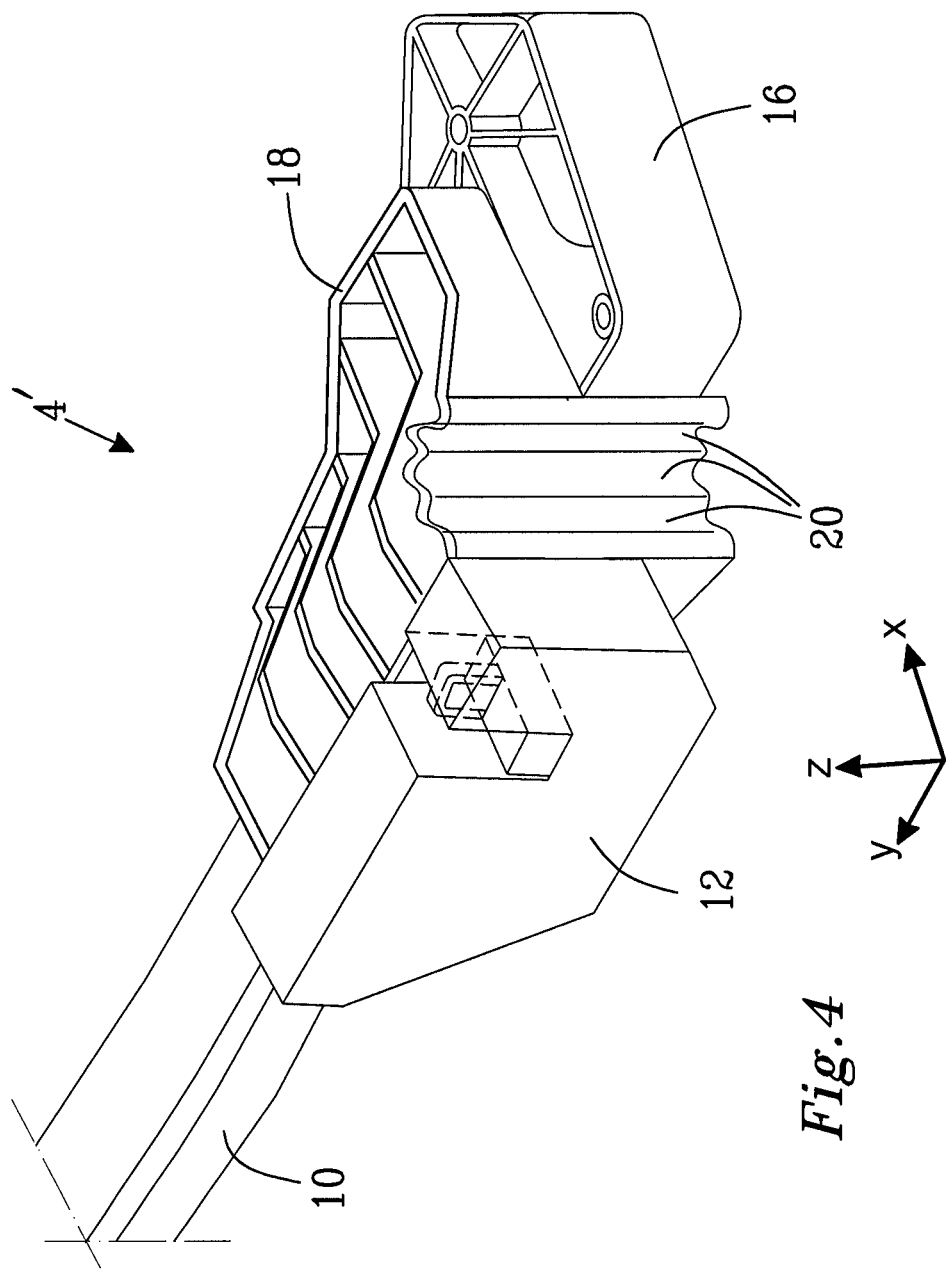
FIG. 4 illustrates a detail of the bonnet latch bracket arrangement of FIG. 3.

FIGS. 3 and 4 schematically illustrate a standard-nose vehicle 2' comprising a bonnet latch bracket arrangement 4' according to a second embodiment of the disclosure. The standard-nose vehicle 2' comprises an openable bonnet 6' and a grille 8', which meets the bonnet 6' in a more forward position of the vehicle 2 as compared to FIG. 1. The bonnet latch bracket arrangement 4' comprises a cross member 10 (not visible in FIG. 3 but in FIG. 4, which forms part of the vehicle body, and two bonnet latches 12, located adjacent to each lateral edge of the bonnet 6.

The cross member 10 is of the same kind as for the soft-nose vehicle 2 of FIGS. 1 and 2. Further, the bonnet latches 12 are also of the same kind as for the soft-nose vehicle 2 of FIGS. 1 and 2. The bonnet latch bracket arrangement 4' thus only differs from that of FIGS. 1 and 2 regarding the bracket member 14'. The bracket member 14' of the second embodiment comprises a first bracket member portion 16 similar to the bracket member 14 of FIGS. 1 and 2. Located on top of the first bracket member portion 16, there is a second bracket member portion 18. The second bracket member portion 18 displaces the location of the bonnet latch 12 forward in the vehicle 2' by a distance corresponding to the difference between the standard-nose vehicle 2' and the soft-nose vehicle 2.

Both the first and second bracket member portions 16, 18 comprise framework structure. The framework of the second bracket member portion 18 is provided with collapse trigger points 20. In case the bonnet latch bracket arrangement 4' is exerted to a longitudinal force, the collapse of the bracket member 14' will start at one or more of the collapse trigger points 20. The second bracket member portion 18 will be compressed in the longitudinal x direction of the vehicle 2. Depending on the size of the force, the first bracket member portion 16 may collapse as well.

As an alternative to using two bracket member portions 16, 18, one bracket member could be used instead, which bracket member is able to take up the dimensional differences between the bonnet latch 12 and the cross member 10 in the longitudinal x, lateral y and/or height direction z of the vehicle 2. It may have the same shape as the combination of the first and second bracket member portions 16, 18 of FIGS. 3 and 4.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

What is claimed is:

1. A bonnet latch bracket arrangement for a vehicle, which arrangement is adaptable to different vehicle models, the arrangement comprising:
   a bonnet latch;
   a bracket member; and
   a vehicle body member;
   wherein the bonnet latch is attachable to the vehicle body member via the bracket member, the bracket member comprises a sleeve portion configured to enclose a portion of the vehicle body member, the bracket member is adapted to take up dimensional differences between the bonnet latch and the vehicle body member in a longitudinal direction, lateral direction and/or height direction of the vehicle, and the adaptability to different vehicle models is achievable by varying the geometry of the bracket member according to dimensions of the vehicle model.

2. The bonnet latch bracket arrangement according to claim 1 wherein a first of the different vehicle models is a soft-nose vehicle and a second of the different vehicle models is a standard-nose vehicle, and wherein the bonnet latch and the vehicle body member have the same geometry for the first and second vehicle models, and the adaptability to the first and said second vehicle models is achievable by varying the geometry of the bracket member.

3. The bonnet latch bracket arrangement according to claim 1 wherein the sleeve portion is adapted to be welded to or heat shrunk to the vehicle body member.

4. The bonnet latch bracket arrangement according to claim 1 wherein the vehicle body member is a cross member adapted to be located at a front of the vehicle.

5. The bonnet latch bracket arrangement according to claim 1 wherein the bracket member is adapted to be attached to a side beam of the vehicle.

6. The bonnet latch bracket arrangement according to claim 1 wherein the bracket member is adapted to collapse when impacted by a force above a predefined level, the predefined level being lower than a level of a force needed to collapse the bonnet latch and/or the vehicle body member.

7. The bonnet latch bracket arrangement according to claim 1 wherein the bracket member is configured to collapse in a preferred direction when mounted in the vehicle.

8. The bonnet latch bracket arrangement according to claim 7 wherein the preferred direction is substantially in a longitudinal direction of the vehicle.

9. The bonnet latch bracket arrangement according to claim 1 wherein the bracket member comprises a framework structure.

10. The bonnet latch bracket arrangement according to claim 1 wherein the bracket member is made of an extruded material.

11. The bonnet latch bracket arrangement according to claim 10 wherein the extruded material comprises extruded aluminum.

12. A bonnet latch bracket arrangement for a vehicle, which arrangement is adaptable to different vehicle models, the arrangement comprising:
   a bonnet latch;
   a bracket member including a framework structure that comprises a collapse trigger point where collapse of the bracket member may be initiated upon sufficient force being exerted on the bracket member; and
   a vehicle body member;
   wherein the bonnet latch is attachable to the vehicle body member via the bracket member, the bracket member is adapted to take up dimensional differences between the bonnet latch and the vehicle body member in a longitudinal direction, lateral direction and/or height direction of the vehicle, and the adaptability to different vehicle models is achievable by varying the geometry of the bracket member according to dimensions of the vehicle model.

13. The bonnet latch bracket arrangement according to claim 12 wherein a first of the different vehicle models is a soft-nose vehicle and a second of the different vehicle models is a standard-nose vehicle, and wherein the bonnet latch and the vehicle body member have the same geometry for the first and second vehicle models, and the adaptability to the first and said second vehicle models is achievable by varying the geometry of the bracket member.

14. The bonnet latch bracket arrangement according to claim 12 wherein the bracket member comprises a first bracket member portion and at least one second bracket member portion, and wherein the first bracket member portion is adapted to fit in a first vehicle model without the at least one second bracket member portion, and the at least one second bracket member portion is adapted to be used in combination with the first bracket member portion in order to fit into a second vehicle model.

15. The bonnet latch bracket arrangement according to claim 14 wherein the at least one second bracket member portion is configured to extend above the first bracket member portion when the at least one second bracket member portion is used in combination with the first bracket member portion.

16. A bonnet latch bracket arrangement for a vehicle, which arrangement is adaptable to different vehicle models, the arrangement comprising:
   a bonnet latch;
   a bracket member;
   a vehicle body member;
   wherein the bonnet latch is attachable to the vehicle body member via the bracket member, wherein the bracket member comprises a first bracket member portion and at least one second bracket member portion, wherein the first bracket member portion is adapted to fit in a first vehicle model without the at least one second bracket member portion, and the at least one second bracket member portion is adapted to be used in combination with the first bracket member portion in order to fit into a second vehicle model, wherein the at least one second bracket member portion is configured to take up dimensional differences between the bonnet latch and the vehicle body member in a longitudinal direction, lateral direction and/or height direction between the first vehicle model and the second vehicle model, and wherein the bonnet latch is mountable in the second vehicle model such that the at least one second bracket member portion is positioned between the bonnet latch and the first bracket member portion and so that the bonnet latch and the first bracket member portion are offset with respect to each other.

17. The bonnet latch bracket arrangement according to claim 16 wherein the at least one second bracket member portion is configured to extend above the first bracket member portion when the at least one second bracket member portion is used in combination with the first bracket member portion.

18. The bonnet latch bracket arrangement according to claim 16 wherein the bonnet latch is mountable in the second vehicle model such that the first bracket member portion and the at least one second bracket member portion are positioned between the bonnet latch and the vehicle body member.

* * * * *